US006600447B1

(12) United States Patent
Molnar

(10) Patent No.: US 6,600,447 B1
(45) Date of Patent: Jul. 29, 2003

(54) APPARATUS AND METHOD FOR DETERMINING SIGNAL DIRECTION FROM AN ESTIMATED SIGNAL MEDIUM RESPONSE FOR A RAY COMPONENT OF A RADIO SIGNAL

(75) Inventor: Karl James Molnar, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/994,268

(22) Filed: Dec. 19, 1997

(51) Int. Cl.[7] ............................. G01S 3/16; H04B 1/10
(52) U.S. Cl. ...................... 342/378; 342/373; 455/283
(58) Field of Search ................................ 455/283, 286; 370/335; 375/347, 150; 342/382, 373, 372, 429

(56) References Cited

U.S. PATENT DOCUMENTS

| | | | | | |
|---|---|---|---|---|---|
| 4,088,955 A | * | 5/1978 | Baghdady | .................... | 455/286 |
| 4,736,460 A | * | 4/1988 | Rilling | ........................ | 455/283 |
| 5,056,051 A | * | 10/1991 | Tkalcevic | .................... | 702/106 |
| 5,323,167 A | * | 6/1994 | Peavey et al. | ............... | 342/429 |
| 5,619,503 A | | 4/1997 | Dent | ........................ | 370/330 |
| 5,680,419 A | * | 10/1997 | Bottomley | .................. | 375/347 |
| 5,687,196 A | * | 11/1997 | Proctor, Jr. et al. | ......... | 375/347 |
| 5,694,133 A | * | 12/1997 | Ghose | ........................ | 342/372 |
| 5,754,138 A | * | 5/1998 | Turcotte et al. | ............. | 342/373 |
| 5,831,977 A | * | 11/1998 | Dent | ........................ | 370/335 |
| 5,841,400 A | * | 11/1998 | Hiramatsu | .................. | 342/382 |
| 5,903,597 A | * | 5/1999 | Pon | ............................. | 375/209 |

FOREIGN PATENT DOCUMENTS

| | | |
|---|---|---|
| WO | WO 96/04738 | 2/1996 |
| WO | WO 96/31010 | 10/1996 |
| WO | WO 97/02666 | 1/1997 |
| WO | WO 97/45968 | 12/1997 |
| WO | WO 98/36596 | 8/1998 |

OTHER PUBLICATIONS

International Search Report, PCT/US98/27104, Apr. 7, 1999.
Jamal et al., "*Adaptive MLSE Performance on the D–AMPS 1900 Channel*", IEEE Transactions on Vehicular Technology, vol. 46, No. 3, Aug. 1997, pp. 634–641.
Salz et al., "*Effect of Fading Correlation on Adaptive Arrays in Digital Mobile Radio*", IEEE Transactions on Vehicular Technology, vol. 43, No. 4, Nov. 1994, pp. 1049–1057.
Xu et al., "*Detection of Number of Sources via Exploitation of Centro–Symmetry Property*", IEEE Transactions on Signal Processing, vol. 42, No. 1, Jan. 1994, pp. 102–112.

(List continued on next page.)

Primary Examiner—Dwayne Bost
Assistant Examiner—Joy Contee
(74) Attorney, Agent, or Firm—Myers Bigel Sibley & Sajovec

(57) ABSTRACT

A direction for a desired radio signal arriving at a receiving station is determined from a plurality of estimated signal medium response coefficients for a ray of the desired radio signal. According to an aspect of the present invention, the estimated signal medium response coefficients for the ray are generated according to an interference rejection combining (IRC) process. According to another aspect, a direction of arrival for a ray of the desired signal is determined and used to compute a power spectral density for the ray for a plurality of directions. A direction of arrival for the ray is then determined by determining a direction for which the power spectral density has a maximum value. In addition to desired signal direction, direction of arrival for an interfering signal can be determined using an impairment autocorrelation matrix that is also generated as part of the IRC process.

43 Claims, 4 Drawing Sheets

OTHER PUBLICATIONS

Winters, *"Signal Acquisition and Tracking with Adaptive Arrays in the Digital Mobile Radio System IS–54 with Flat Fading"*, IEEE Transactions on Vehicular Technology, vol. 42, No. 4, Nov. 1993, pp. 377–384.

Roy, *"ESPRIT: Estimation of Signal Parameters Via Rotational Invariance Techniques"*, Ph.D. Dissertation, Stanford University, Aug. 1987.

Schmidt, *A Signal Subspace Approach to Multiple Emitter Location and Spectral Estimation*, Ph.D. Dissertation, Stanford University, Nov. 1981.

Forssen et al., *Method of and Apparatus for Interference Rejection Combining and Downlink Beamforming in a Cellular Radio Communications System*, U.S. patent application Ser. No. 08/655,930.

Molnar et al., *"Terminal Position Location Using Multiple Beams"*, U.S. patent application Ser. No. 08/597,073.

*"Method of an Apparatus for Interference Rejection Combining in Multi–Antenna Digital Cellular Communications Systems"*, U.S. patent application Ser. No. 08/284,775, filed Aug. 2, 1994.

Dent et al., *"Position Registration for Cellular Satellite Communication Systems"*, U.S. patent application Ser. No. 09/179,958.

* cited by examiner

APPARATUS AND METHOD FOR DETERMINING SIGNAL DIRECTION FROM AN ESTIMATED SIGNAL MEDIUM RESPONSE FOR A RAY COMPONENT OF A RADIO SIGNAL

FIELD OF THE INVENTION

The present invention relates to communications apparatus and methods, more particularly, to apparatus and methods for determining a direction of a radio signal.

BACKGROUND OF THE INVENTION

Wireless communications systems such as cellular radiotelephone systems typically are subject to performance-degrading environmental effects such as multi-path fading and interference. Fading effects include flat fading, arising from the interaction of a transmitted signal (the main ray) with reflected versions of the transmitted signal that arrive concurrently at a receiver. Time dispersion, another type of fading, arises from interaction of the main ray with time-delayed reflections of the main ray. Interference effects may be caused by interaction of non-orthogonal signals generated in the signal medium by sources other than the source of the desired transmitted signal. Well-known techniques for reducing the effects of flat fading include diversity combining of signals from spatially separated antennas. Equalization techniques such as maximum likelihood sequence estimation (MLSE) may be used to compensate for time dispersion. Interference may be reduced by using antenna beam steering to reduce reception of undesired signals.

U.S. patent application Ser. No. 08/284,775, filed Aug. 2, 1994, assigned to the assignee of the present invention and incorporated herein by reference, has proposed an interference rejection combining (IRC) technique which compensates for flat fading, time dispersion and interference. An impairment autocorrelation matrix is computed and used to compute branch metrics for a sequence estimation process which are corrected for the presence of interfering signals, i.e., impairments, using the autocorrelation properties of the interfering signals. According to U.S. patent application Ser. No. 08/655,930, filed May 31, 1996, assigned to the assignee of the present application and incorporated herein by reference in its entirety, IRC may be used to determine a covariance matrix of a desired signal, and downlink beam-steering techniques may be employed based on the determined covariance to improve communications between a mobile unit and a base station Unfortunately, however, estimates of direction of arrival of a desired signal produced using the approach described in the aforementioned U.S. patent application Ser. No. 08/655,930 can be inaccurate due to noise introduced in determining the covariance matrix of the desired signal. The noise susceptibility may in turn require increased sampling to achieve a desired accuracy for the estimate of the direction of arrival. Accordingly, there is a need for improved techniques of direction estimation that are less susceptible to noise and can provide more accurate results without requiring undue sampling.

SUMMARY OF THE INVENTION

In light of the foregoing, it is an object of the present invention to provide apparatus and methods for determining a direction for a desired signal that are resistant to fading and interference effects.

It is another object of the present invention to provide apparatus and methods for determining a direction for a desired signal that can provide greater accuracy than conventional techniques.

It is yet another object of the present invention to provide apparatus and methods for determining direction of an interfering signal.

These and other objects, features and advantages are provided according to the present invention by apparatus and methods in which a direction for a desired radio signal arriving at a receiving station is determined from a plurality of estimated signal medium response coefficients for a ray of the desired radio signal. According to an aspect of the present invention, the estimated signal medium response coefficients for the ray are generated according to an interference rejection combining (IRC) process, an equalization process that compensates for interference. According to another aspect, a direction of arrival for a ray of the desired signal is determined and used to compute a power spectral density for the ray for a plurality of directions. A direction of arrival for the ray is then determined by determining a direction for which the power spectral density has a maximum value. By determining desired signal direction utilizing coefficients for a ray which are normally generated as part of an IRC process, a technique for determining signal direction is provided which is potentially more efficient than conventional techniques. In addition to desired signal direction, direction of arrival for an interfering signal can be efficiently determined using an impairment autocorrelation matrix that is also generated as part of the IRC process.

In particular, according to the present invention, a direction for a desired radio signal generated in a communications medium is determined. A plurality of radio signals is received from the communications medium, e.g., at a like plurality of antennas. A plurality of estimated signal medium response coefficients for a ray of the desired radio signal are generated from the plurality of received radio signals. A direction for the desired radio signal is determined from the plurality of estimated signal medium response coefficients for the ray of the desired radio signal. A direction for the desired radio signal may be determined by determining a direction of arrival for the ray from the corresponding plurality of estimated signal medium response coefficients for the ray, and then determining a direction for the desired radio signal from the determined direction of arrival for the ray.

According to an aspect of the present invention, the plurality of estimated signal medium response coefficients for the ray may be generated by generating a first plurality of estimated signal medium response coefficients. An impairment autocorrelation matrix is then generated from the plurality of received signals and the first plurality of estimated signal medium response coefficients. A branch metric is generated from the generated impairment autocorrelation matrix and the first plurality of estimated signal medium response coefficients, and a symbol estimate is generated from the generated branch metric. A second plurality of estimated signal medium response coefficients may then be generated from the plurality of received signals and the generated symbol estimate.

According to another aspect of the present invention, the plurality of estimated signal medium response coefficients may be generated by generating a series of pluralities of estimated signal medium response coefficients over a time interval, processing the series of pluralities of estimated signal medium response coefficients with a tracking filter to produce a plurality of predicted signal medium response coefficients, and determining a determining a direction for the desired radio signal from the plurality of predicted signal medium response coefficients for the ray of the desired radio signal. The desired radio signal may be formatted according to a slotted communications protocol defined according to a plurality of time slots, and the series of pluralities of estimated signal medium response coefficients may be generated over at least one of the plurality of time slots.

According to another tracking aspect, a plurality of impairment autocorrelation matrices may be estimated over a time interval, e.g., over a time slot or a plurality of time slots in a slotted communications system. The generated plurality of impairment autocorrelation matrices may then be processed with a tracking filter to produce a predicted impairment autocorrelation matrix. A branch metric may then be generated from the predicted impairment autocorrelation matrix, and used to generate an improved direction estimate.

According to yet another method aspect of the present invention, a direction of arrival for the ray is determined by determining an autocorrelation value for the ray of the desired radio signal. A plurality of power spectral density values may be then be determined for the ray at a like plurality of directions using the determined autocorrelation value. A direction of the plurality of directions having a maximum associated determined power spectral density value is then identified to thereby determine a direction of arrival for the ray. According to another tracking aspect, a plurality of directions of arrival for the ray may be determined over a time interval such as a time slot or plurality of time slots. The determined plurality of directions of arrival may be processed with a tracking filter to produce a predicted direction of arrival for the ray.

In other method aspects, a direction for an interfering radio signal is determined from the generated impairment autocorrelation matrix. A plurality of power spectral density values may be determined for the interfering radio signal at a like plurality of directions using the generated impairment autocorrelation matrix. A direction of the plurality of directions having a maximum associated determined power spectral density value may then be identified to thereby determine a direction for the interfering radio signal. The determined direction of arrival may be tracked over a time interval, such as a time slot or series of time slots.

An apparatus for receiving a desired radio signal generated in a communications medium includes means, responsive to the communications medium, for receiving a plurality of radio signals from the communications medium. Means are responsive to the means for receiving for generating a plurality of estimated signal medium response coefficients for a ray of the desired radio signal from the plurality of received radio signals. Means are also provided, responsive to the means for generating, for determining a direction for the desired radio signal from the plurality of estimated signal medium response coefficients for the ray of the desired radio signal. The means for determining a direction for the desired radio signal may comprise means for determining a direction of arrival for the ray from the corresponding plurality of estimated signal medium response coefficients for the ray, as well as means for determining a direction for the desired radio signal from the determined direction of arrival for the ray.

The means for generating a plurality of estimated signal medium response coefficients may include means for generating a first plurality of estimated signal medium response coefficients. Means are responsive to the means for generating a first plurality of estimated signal medium response coefficients, for generating an impairment autocorrelation matrix from the plurality of received signals and the first plurality of estimated signal medium response coefficients. Additional means are provided, responsive to the means for generating an impairment autocorrelation matrix, for generating a branch metric from the generated impairment autocorrelation matrix and the first plurality of estimated signal medium response coefficients. Means are also provided, responsive to the means for generating a branch metric, for generating a symbol estimate from the generated branch metric. Means for generating a second plurality of estimated signal medium response coefficients from the plurality of received signals and the generated symbol estimate are provided. The apparatus may further include means for determining a direction for an interfering radio signal of the plurality of radio signals from the generated impairment autocorrelation matrix.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF THE PREFERRED EMBODIMENTS

Figure 1:
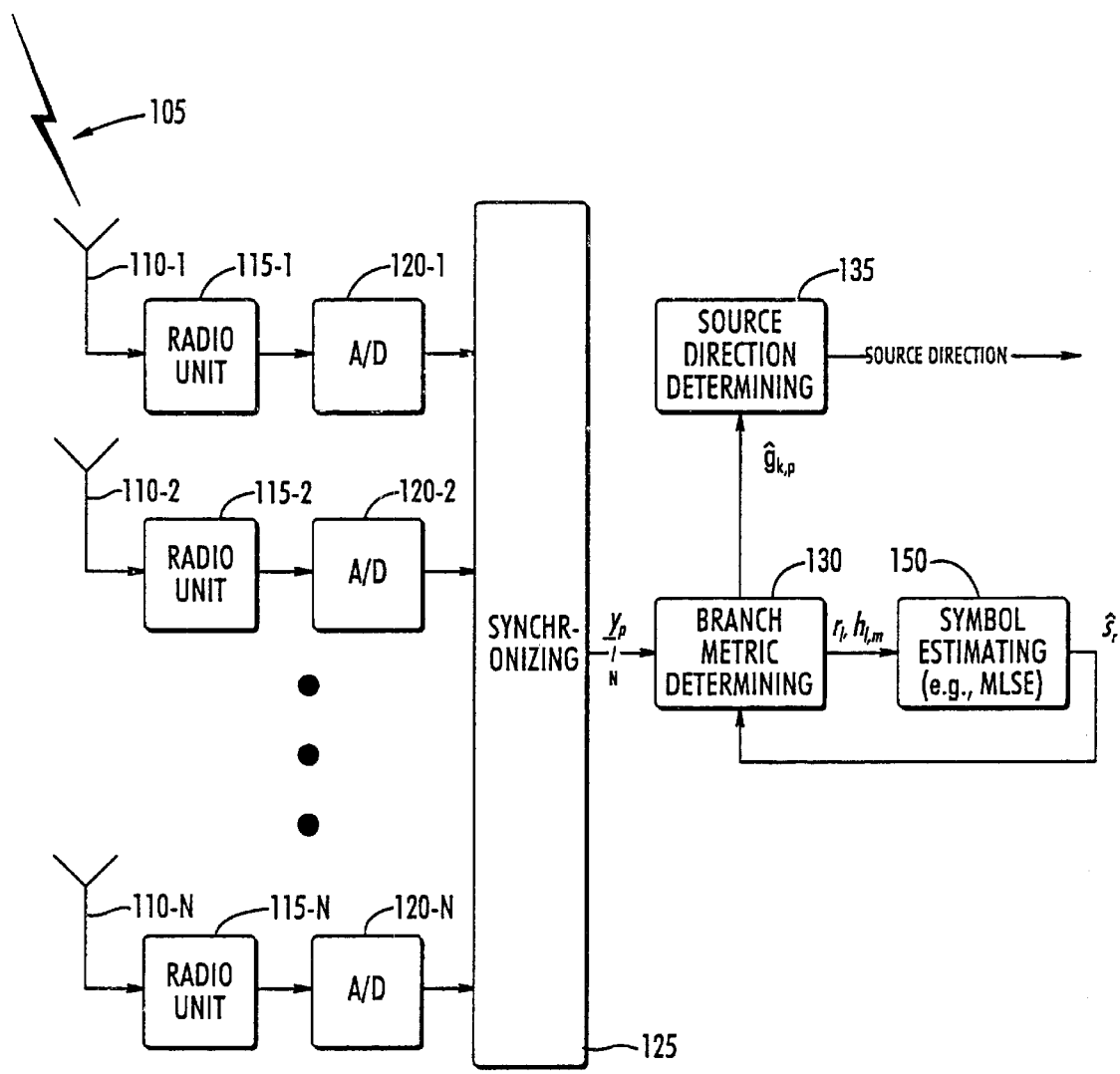
FIG. 1 is a schematic illustration of an apparatus for determining a direction for a desired signal according to an embodiment of the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Interference Rejection Combining

A transmitted symbol sequence may be represented as $s=\{S_{-L}, \ldots, S_L\}$. A signal $\underline{r}(t)$ presented at $N_a$ antennas may be take the vector form $$\underline{r}(t)=\underline{s}_0(t; s_0)+\underline{w}(t), \quad (1)$$

where a desired signal $\underline{S}_0(t;s_0)$ may be represented as $$s_0(t;s_0) = \sum_{l=-L}^{L} s_{0,l}\underline{h}(t, lT), \quad (2)$$

$\underline{w}(t)$ is an impairment process, $h(t,lT)$ is a composite signal medium, i.e., channel, response for the desired signal and T is the symbol interval. It may be assumed that the impairment process contains both $N_i$ undesired, e.g., interfering, signals and a zero-mean, white noise process $\underline{n}(t)$ such that $$\underline{w}(t) = \sum_{i=1}^{N_1} \underline{s}_i(t; s_i) + \underline{n}(t), \quad (3)$$

where the undesired signals $\underline{s}_i(t;s_i)$ have a similar form to the desired signal of equation (2) and wherein $$E\{\underline{n}(t)\underline{n}^H(s)\} = \frac{N_0}{2}\delta(t-s), \quad (4)$$

where $N_0$ is the noise power spectral density. A composite signal medium response for the desired signal may be resolved into two components: (1) a propagation signal medium response $\underline{g}(t, lT)$ and (2) a fixed transmit filter response $f(t, lT)$. The composite signal medium response $\underline{h}(t,lT)$ may then be assumed to have the form $$\underline{h}(t, lT) = \sum_{k=-\infty}^{\infty} f(t - (k+lM)T_s)\underline{g}_k(t) \quad (5)$$

$$\approx \sum_{k=-\infty}^{\infty} f(t - (k+lM)T_s)\underline{g}_{k,k+lM},$$

where t is time, $T_s$ is the sample interval, M is the number of samples per symbol interval t, and $\underline{g}_k$ are the channel tap coefficients for the channel response, the kth channel tap is assumed to be constant over the transmit pulse. Those skilled in the art will appreciate that the above relationship may be used when the sample interval $T_s$ is a fraction of the symbol interval T, corresponding to M equal to an integer greater than one.

An equalizer may compute a log-likelihood metric $LL(\underline{s};\underline{r}(t))$ for a hypothesized symbol $\underline{s}$ given a received signal $\underline{r}(t)$ according to $$LL(\underline{s}; \underline{r}(t)) = \sum_{l=-L}^{L} 2\mathrm{Re}\{s_l^* r_l\} - \sum_{l=-L}^{L}\sum_{m=-L}^{L} s_l^* h_{l,m} s_m \quad (6)$$

$$= \sum_{l=-L}^{L}\left[2\mathrm{Re}\{s_l^* r_l\} - |s_l|^2 h_{l,l} - \sum_{n=L}^{l+L} s_l^* h_{l,l-n} s_{l-n}\right]$$

where $$r_l = \sum_{k=-\infty}^{\infty} \underline{g}_{k,k+lM}^H \underline{y}_{k+lM} \quad (7)$$

represents the overall channel matched response, $$y_p = \int_{-\infty}^{\infty} f^*(t - pT_s)\underline{r}(t)dt \quad (8)$$

represents the filter matched response, $$h_{l,m} = \sum_{k=-\infty}^{\infty}\sum_{j=-\infty}^{\infty} \underline{g}_{k,k+lM}^H \underline{g}_{j,j+mM} \rho_{(k-j)-(l-m)M} \quad (9)$$

represents an interaction term for symbols $s_l$ and $s_m$, and $$\rho_{(k-j)-(l-m)M} = \int_{-\infty}^{\infty} f^*(t - (k+lM)T_s)f(t - (j+mM)T_s)dt \quad (10)$$

represents the pulse autocorrelation function.

For a symbol-spaced equalizer with Nyquist pulse shapes, equations (8) and (9) become $$y_p = \int_{-\infty}^{\infty} f^*(t - pT)\underline{r}(t)dt \quad (11)$$

and $$h_{l,m} = \sum_{k=-\infty}^{\infty}\sum_{j=-\infty}^{\infty} \underline{g}_{k,k+l}^H \underline{g}_{k+(l-m),k+l}, \quad (12)$$

respectively.

In performing interference rejection combining, the impairment spatial autocorrelation matrix is estimated and inserted into the metric equations in the following manner:

$$r_l = \sum_{k=-\infty}^{\infty} \underline{g}_{k,k+lM}^H \int_{-\infty}^{\infty} R^{-1}(\tau, (k+lM)T_s)\underline{y}((k+lM)T_s - \tau)d\tau \quad (13)$$

$$\approx \sum_{k=-\infty}^{\infty} \underline{g}_{k,k+lM}^H \sum_{l=-\infty}^{\infty} R_{i,k+lM}^{-1} \underline{y}_{k+lM-i},$$

and $$h_{l,m} = \sum_{k=-\infty}^{\infty}\sum_{j=-\infty}^{\infty} \underline{g}_{k,k+lM}^H Q_{k-j+(l-m)M,k+lM} \underline{g}_{j,j+mM}, \quad (14)$$

where $$Q_{k-j+(l-m)M,k+lM} = \int_{-\infty}^{\infty} R^{-1}(\tau, (k+lM)T_s)\rho((k+lM)T_s - (j+mM)T_s - \tau)dt, \quad (15)$$

$$\approx \sum_{j=-\infty}^{\infty} R_{i,k+lM}^{-1} \rho_{(k-j-i)+(l-m)M}.$$

In other words, the impairment autocorrelation matrix R is used to generate branch metrics which are compensated for the presence of interfering signals. The above approach is discussed in the aforementioned U.S. patent application Ser. No. 08/284,775.

Direction Estimation Using Phased Arrays

Consider a received signal taking the form $$\underline{x}(t) = \underline{a}(\Phi)s(t) + \underline{n}(t), \quad (16)$$

where $\underline{a}(\Phi)$ is the directional component of the signal presented at the array elements, $s(t)$ is the transmitted signal and $\underline{n}(t)$ is a zero-mean, white noise component. Let $\underline{y}(t) = A^H \underline{x}(t)$ be the beamformed signal where A is the beamforming matrix. The spatial power spectrum of the signal $\underline{x}(t)$ may be estimated by computing $$P_x(\Phi) = \frac{\underline{a}^H(\Phi) R_{xx} \underline{a}(\Phi)}{|\underline{a}(\Phi)|^2} \quad (17)$$

where the autocorrelation matrix $R_{xx}$ is estimated by $$R_{xx}(\Phi) = \frac{1}{N} \sum_{n=1}^{N} \underline{x}(t - nT_s) \underline{x}^H(t - nT_s). \quad (18)$$

The spatial power spectrum $P_y(\Phi)$ may similarly be computed as $$P_y(\Phi) = \frac{[A^H \underline{a}(\Phi)]^H R_{yy} [A^H \underline{a}(\Phi)]}{|A^H \underline{a}(\Phi)|^2} \quad (19)$$

where the autocorrelation matrix $R_{yy}$ is estimated by $$R_{yy}(\Phi) = \frac{1}{N} \sum_{n=1}^{N} \underline{y}(t - nT_s) \underline{y}^H(t - nT_s) \quad (20)$$
$$= A^H R_{xx} A.$$

The estimated direction is may then be computed by finding the value of the direction variable $\Phi$ that maximizes either equation (17) or (19).

In the aforementioned U.S. patent application Ser. No. 08/655,930, a direction of arrival for a desired signal is estimated by maximizing power spectral density as shown above using a interferer-compensated overall signal autocorrelation $R_{xx}$ computed as $R_{xx} = R_{rr} - R_{ii}$, where $R_{rr}$ represents a running average of a received signal and $R_{ii}$ is an overall impairment autocorrelation matrix. Although this approach can provide an accurate estimate of direction of arrival, it may introduce noise which can reduce accuracy and/or which may require increased sampling to obtain a desired level of accuracy.

The present invention arises from the realization that an accurate estimate of a direction for a desired signal may be obtained directly from estimated signal medium response coefficients (channel taps) for a ray of the desired signal, i.e., for a component of the desired signal at one or more delays, instead of computing an overall autocorrelation for the desired signal and using it to determine a direction of arrival for the desired signal. According to the present invention, the estimated signal medium response coefficients $g_{k,k+1M}$ for a kth ray of the desired signal may be assumed to be a function of some direction parameter $\Phi_k$; for example, $\Phi_k = [\Phi_{k,az}, \Phi_{k,el}]$ may describe the azimuth and elevation angles, respectively, of the medium response for the kth ray of the desired signal, where either $\Phi_{k,az}$ or $\Phi_{k,el}$ may itself be known or assumed known.

According to an aspect of the present invention, an autocorrelation for the kth ray may be computed as $$R_{gkgk}(\Phi_k) = \frac{1}{N} \sum_{n=1}^{N} \underline{g}_{k,k+lM} \underline{g}^H_{k,k+lM}, \quad (21)$$

allowing a spectral power density for the kth ray to be computed as $$P_{gk}(\Phi_k) = \frac{[A^H \underline{a}^H(\Phi_k)] R_{gkgk} [A^H \underline{a}(\Phi_k)]}{|A^H \underline{a}(\Phi_k)|^2} \quad (22)$$

The estimated direction for the kth ray can be estimated by finding the value of $\Phi_k$ that maximizes $P_{gk}(\Phi_k)$. The $g_{k,k+1M}$ represent a signal medium response for a kth ray, and in order to compute estimates of these components, the filtered data $y_{k+1M}$ may be used. In addition to this power spectral density maximization technique, other techniques may be used to determined direction for a ray based on the $g_{k,k+1M}$, as will be discussed in greater detail below.

Estimation of the direction for desired signal may computed from the determined direction of arrival of a ray of the desired signal in a number of ways. A particular ray might be selected for DOA computation because it may provide the greatest accuracy, for example. In other embodiments, a weighted combination of direction of arrival estimates for a plurality of rays of the desired signal may be computed to provide an accurate estimate of the direction of the source.

The direction of arrival information may be used for beamsteering and other applications. In addition, estimates of the directional components of an undesired signal may be generated using $R_{I,k+1M}$ in a spatial power spectral density equation, and determining the direction of arrival for the undesired signal which maximizes power spectral density, as described above. This information may be advantageously used for antenna pattern nulling and other purposes, as described in greater detail below.

Estimating Direction from Estimated Signal Medium Response Coefficients of a Component Ray FIG. 1 illustrates the use of interference rejection combining (IRC) to produce estimated signal medium response coefficients $\hat{g}_{k,p}$ according to an embodiment of the present invention. N antennas 110-1, . . . , 110-N receive a plurality of radio signals from a composite signal 105 arriving at a receiving station 100. The plurality of received radio signals are passed to N radio units 115-1, . . . , 115-N. These signals are output from the radio units 115-1, . . . , 115-N and digitized by analog-to-digital (A/D) converters 120-1, . . . , 120-N. A synchronizer 125 performs synchronization on these signals, resulting in a N-dimensional vector output signal $\underline{y}_p$. Those skilled in the art will appreciate that synchronization may be performed jointly using all digitized signals to come up with one common sample timing, or may be performed individually for each digitized signal.

The signal $\underline{y}_p$ is passed to a branch metric determining means 130, which computes branch metrics $r_l$ and $h_{l,m}$ for use in the symbol estimating means 150. The branch metric determining means 130 also produces estimated signal medium response coefficients $\hat{g}_{k,p}$ based on the received signal data $\underline{y}_p$, as well as an impairment autocorrelation matrix $\underline{R}_{i,p}$ which is also estimated from the received data $\underline{y}_p$. The symbol estimating means 150 produces an estimated symbol $\hat{s}_r$, performing symbol hypothesis and detection using, for example, a Viterbi algorithm employed as part of a maximum likelihood sequence estimation (MLSE) process. A direction determining means 135 determines a direction for the desired signal from the estimated signal medium response coefficients $\hat{g}_{k,p}$ for the kth ray of the desired signal.

Those skilled in the art will appreciate that the radio units 115-1, . . . , 115-N, A/D converters 120-1, . . . , 120-N, the synchronizer 125, the branch metric determining means 130, the symbol estimating means 150, and the direction determining means 135 may include a variety of commonly-used communications components such as filters, demodulators, digital signal processors and the like, the operation of which is well-know to those of skill in the art and need not be discussed in detail herein. In general, it will be appreciated that the functions of these components may be implemented using special-purpose hardware, software or firmware running on general or special purpose data processors, and combinations thereof.

Figure 2:
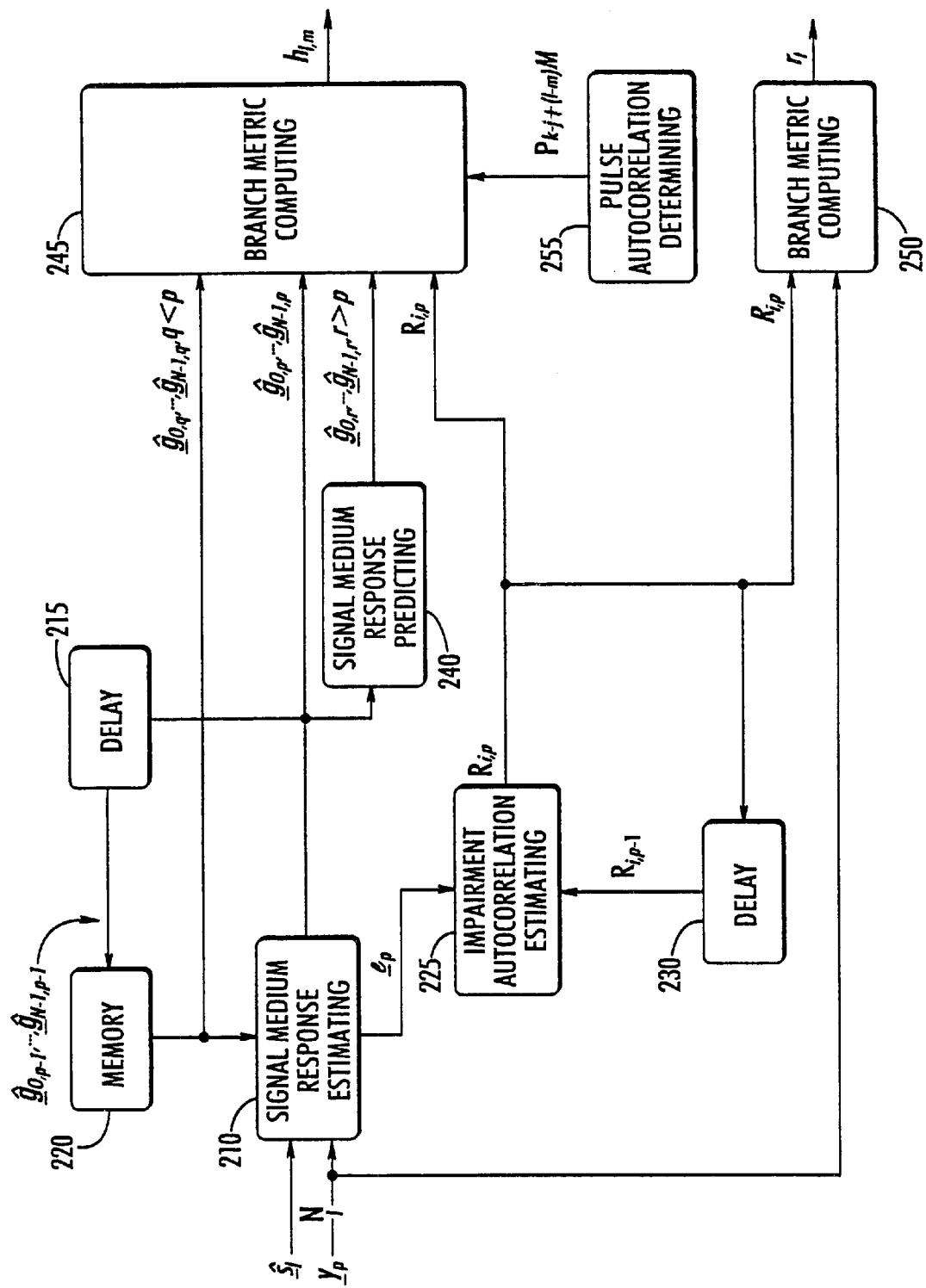
FIG. 2 is a schematic illustration of an apparatus for determining signal medium response coefficients and branch metrics using interference rejection combining according to an embodiment of the present invention.

FIG. 2 illustrates an embodiment of the branch metric determining means 130 of FIG. 1 in detail. A memory 220 stores estimated signal medium response coefficients $\hat{\underline{g}}_{0,p}, \ldots, \hat{\underline{g}}_{N-1,p}$ generated by signal medium response estimating means 210. A delay 215 is provided between the signal medium response estimating means 210 and the memory 220. The signal medium response estimating means 210 generates estimated signal medium response coefficients $\hat{\underline{g}}_{0,p}, \ldots, \hat{\underline{g}}_{N-1,p}$ given previously generated estimated signal medium response coefficients $\hat{\underline{g}}_{0,p-1}, \ldots, \hat{\underline{g}}_{N-1,p-1}$ received from the memory 220, received data $\underline{y}_p$ and a symbol hypothesis $\hat{s}_l$, which may be a symbol estimate obtained using an MLSE or other symbol estimating process such as one performed by the symbol estimating means 150 depicted in FIG. 1. To provide improved accuracy, a known training sequence, i.e., a synchronization sequence, may be employed to assist in estimation of the signal medium response in the signal medium response estimating means 210. For example, the training sequence may be used as the source of an initial symbol hypothesis $\hat{s}_l$ for determining the estimated signal medium response coefficients $\hat{\underline{g}}_{0,p}, \ldots, \hat{\underline{g}}_{N-1,p}$.

Signal medium response predicting means 240 uses the estimated signal medium response coefficients $\hat{\underline{g}}_{0,p}, \ldots, \hat{\underline{g}}_{N-1,p}$ to produce estimated future signal response medium coefficients $\hat{\underline{g}}_{0,r}, \ldots, \hat{\underline{g}}_{N-1,r}$, which are in turn used to compute the branch metrics $h_{l,m}$ and $r_l$. Impairment autocorrelation estimating means 225 computes impairment autocorrelation values $R_{i,p}$ (an N×N matrix) from an error signal $\underline{e}_p$ representing a difference between the received data $\underline{y}_p$ and the symbol hypothesis $\hat{s}_l$. The impairment autocorrelation matrix $R_{i,p}$ may be computed for sample time p and different delay indices i; setting i∈{0} gives conventional interference rejection combining. A second delay 230 produces delayed impairment autocorrelation values $R_{i,p-1}$, for use in estimating the impairment autocorrelation values $R_{i,p}$.

First branch metric computing means 245 computes a first branch metric $h_{l,m}$, e.g., using equations (14) and (15), augmented by pulse autocorrelation values $\rho_{k-j+(l-m)M}$ provided by a pulse autocorrelation determining means 255, e.g., a look-up table of pulse autocorrelation values. A second branch metric computing determining means 250 computes a second metric $r_l$ as in equation (13). It may be assumed that the summations in equation (13) are finite, i.e., $$r_l = \sum_{k=0}^{N-1} \hat{g}_{k,k+lM}^H \sum_{i=0}^{l-1} R_{i,k+lM}^{-1} y_{k+lM-i}$$

and that all terms are available. As illustrated in FIG. 1, the first and second metrics $h_{l,m}$ and $r_l$ may be used by the symbol estimating means 150 to produce the estimated symbol values $\hat{s}_r$. Those skilled in the art will appreciate that various apparatus may be used to produce the symbol values $\hat{s}_r$, such as MLSE sequence estimators, decision decoders and the like.

Figure 3:
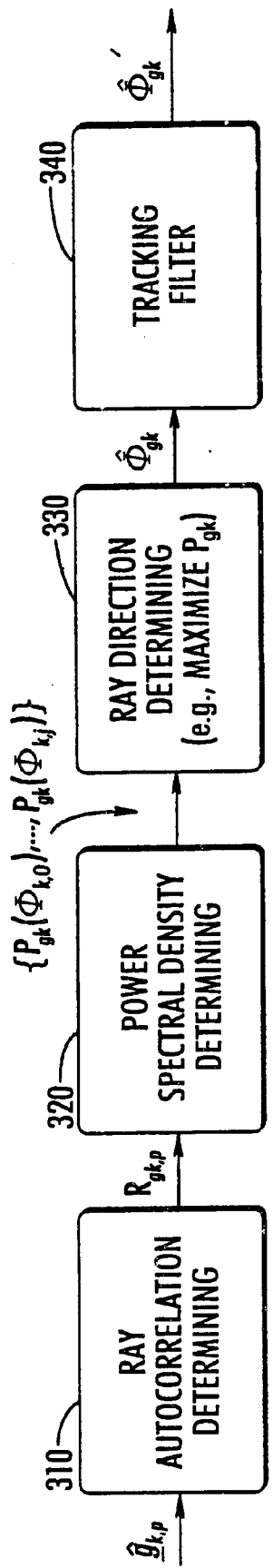
FIG. 3 is a schematic illustration of an apparatus for determining a direction for a desired signal according to an embodiment of the present invention.

The estimated signal medium response coefficients $\hat{\underline{g}}_{0,p}, \ldots, \hat{\underline{g}}_{N-1,p}$ for a desired signal and the estimated impairment autocorrelation values $R_{i,p}$ may be used to determine a direction for a desired signal. FIG. 3 illustrates an exemplary structure in which a ray autocorrelation determining means 310 determines an autocorrelation $R_{gk,p}$ for the kth ray of the desired signal across antennas, e.g., as described in equation (21). This value is used by a power spectral density determining means 320 to determine spatial power spectral density values $P_{gk}(\Phi_k)$ for the kth ray as described in equation (22). Note that this may be performed for $\Phi_k$ belonging to a set of hypothesized directions $\{\Phi_k\}$. A ray direction determining means 330 determines a value of $\Phi_k$ that maximizes $Pg_k(\Phi_k)$, producing an estimated direction of arrival $\hat{\Phi}_{gk}$ for the kth ray.

Those skilled in the art will appreciate that $P_{gk}(\Phi_k)$ can be smoothed or averaged over time to give better estimates. $Pg_k(\Phi_k)$ can also be averaged over multiple antenna arrays to obtain spatial averaging. The estimated direction of a arrival $\hat{\Phi}_{gk}$ for a kth ray, e.g., a main ray, may be used alone to estimate the direction of the desired signal, or a weighted combination of estimated directions of a arrival for a plurality of rays may be used to determine a direction for the desired signal.

A direction of arrival for an interfering signal can also be obtained using the interference rejection combining process. Because the interference rejection combining process illustrated in FIG. 2 can provide impairment autocorrelation values $R_{i,p}$ directly, the direction of arrival for the interfering signal may be directly determined by determining the interfering signal's power spectral density $P_i(\Phi_k)$ for a plurality of directions $\Phi_k$ in a power spectral density determining means 410, and determining the value $\hat{\Phi}_i$ that maximizes the interfering signal's power spectral density $P_i(\Phi_k)$ in an interfering signal direction determining means 420.

Additional operations may also be performed to generate improve direction estimates. In a slotted time division multiple access (TDMA) system, for example, the direction estimates $\hat{\Phi}_{gk}$ and/or $\hat{\Phi}_i$ may be tracked over one or more slots using a tracking filter 350, 420 to yield predicted directions $\hat{\Phi}_{gk}'$, $\hat{\Phi}_i'$. Similarly, the estimated signal medium response coefficients $\hat{\underline{g}}_{0,p}, \ldots, \hat{\underline{g}}_{N-1,p}$ and the impairment autocorrelation values $R_{i,p}$ may be tracked within a slot or over a plurality of slots to produce improved direction estimates.

Figure 4:
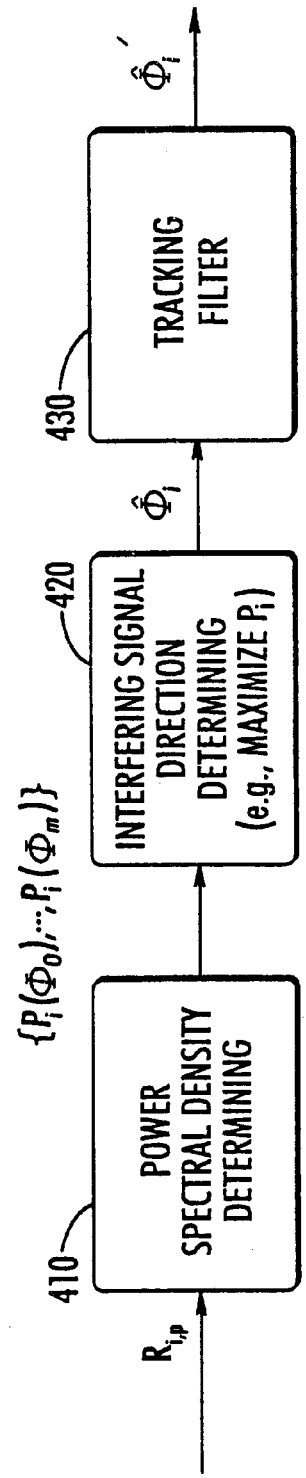
FIG. 4 is a schematic illustration of an apparatus for determining a direction for an interfering signal according to an aspect of the present invention.

Those skilled in the art will appreciate that the apparatus illustrated in FIGS. 2–4 may include a variety of commonly-used communications components. For example, the apparatus of FIG. 2 may be implemented using one or more digital signal processor (DSP) chips and/or application specific integrated circuits (ASICs). In general, it will be appreciated that the apparatus of FIGS. 2–4 may be implemented using special-purpose hardware, software or firmware running on general or special purpose data processors, and combinations thereof.

It will be appreciated that techniques for determining directions for desired and interfering signals other than the aforementioned spectral power density maximization approach may be used with the present invention. For example, a technique could be utilized which determine direction using signal strength estimates computed from the $g_k$, similar to the technique described in U.S. patent application Ser. No. 08/597,073. Other approaches, such ones based on the MUSIC techniques described in "A Signal Subspace Approach to Multiple Emitter Location and Spectral Estimation", by Schmidt (Stanford University Ph.D. dissertation, 1981), or the ESPRIT techniques described in "ESPRIT, Estimation of Signal Parameters via Rotational Invariance Techniques", by Roy (Stanford University Ph.D. dissertation, 1987), could be used as well.

The directional information for desired and interfering signals may be used for a number of different purposes. For example, the estimated directions $\hat{\Phi}_{gk}$ and $\hat{\Phi}_i$ may be used to steer maximum gain portions of an antenna pattern to advantageously receive a desired signal, in a manner similar to the beamsteering operations described in the aforementioned U.S. patent application Ser. No. 08/655,930. Estimates of interfering signal directions may be used, for example, for nulling a receive antenna pattern to reduce interference, as well as for such features as predicting mobile unit handoffs and the like.

Figure 5:
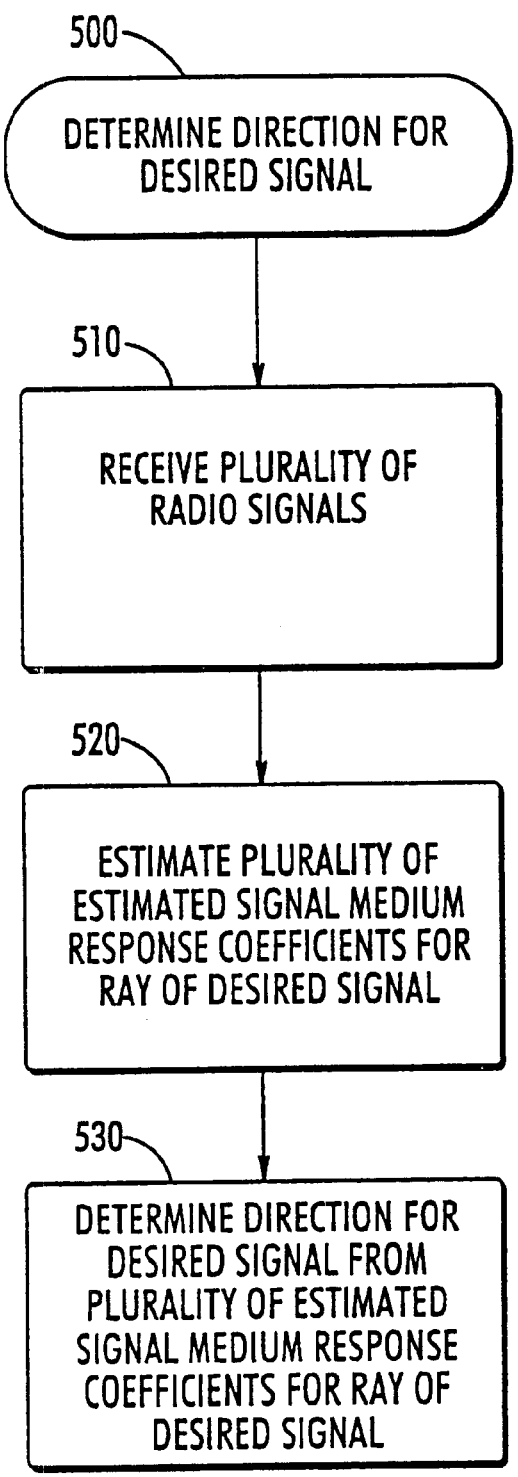
FIG. 5 is a flowchart illustration of operations for determining a direction for a desired signal according to an aspect of the present invention.

FIG. 5 is a flowchart illustration of operations for determining a direction for a desired signal arriving at a receiving station (Block 500). A plurality of radio signals are received at a plurality of antennas (Block 510). A plurality of estimated signal medium response coefficients for a ray of the desired radio signal are generated from the plurality of received signals (Block 520), e.g., using in interference rejection combining technique as described with respect to FIG. 2. A direction for the desired signal is determined from the plurality of estimated signal medium response coefficients for the ray of the desired signal (Block 530), for example, by computing an autocorrelation for the ray and determining a direction that maximizes a power spectral density function of the autocorrelation.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of determining a direction for a desired radio signal generated in a communications medium, the method comprising the steps of:

receiving a plurality of radio signals from the communications medium;

generating a plurality of estimated signal medium response coefficients for a ray of the desired radio signal from the plurality of received radio signals; and determining a direction for the desired radio signal from the plurality of estimated signal medium response coefficients for the ray of the desired radio signal.

2. A method according to claim 1, wherein said step of receiving comprises the step of receiving the plurality of radio signals at a like plurality of antennas.

3. A method according to claim 2:

wherein said step of determining a direction for the desired radio signal comprises the step of determining a direction of arrival for the ray from the corresponding plurality of estimated signal medium response coefficients for the ray; and wherein said step of determining a direction for the desired radio signal comprises the step of determining a direction for the desired radio signal from the determined direction of arrival for the ray.

4. A method according to claim 2:

wherein said step of generating a plurality of estimated signal medium response coefficients comprises the steps of:

generating a series of pluralities of estimated signal medium response coefficients over a time interval; and processing the series of pluralities of estimated signal medium response coefficients with a tracking filter to produce a plurality of predicted signal medium response coefficients; and wherein said step of determining a direction for the desired radio signal comprises the step of determining a direction for the desired radio signal from the plurality of predicted signal medium response coefficients for the ray of the desired radio signal.

5. A method according to claim 4, wherein the desired radio signal is formatted according to a slotted communications protocol defined according to a plurality of time slots wherein said step of generating a series of pluralities of estimated signal medium response coefficients over a time interval comprises the step of generating a series of pluralities of estimated signal medium response coefficients over at least one of said plurality of time slots.

6. A method according to claim 2, wherein the desired radio signal represents a sequence including a predetermined training sequence, and wherein said step of generating a plurality of estimated signal medium response coefficients, comprises the step of generating a plurality of estimated signal medium response coefficients from the plurality of received radio signals based on the predetermined training sequence.

7. A method according to claim 2, wherein said step of generating a plurality of estimated signal medium response coefficients for the ray comprises the steps of:

generating a first plurality of estimated signal medium response coefficients;

generating an impairment autocorrelation matrix from the plurality of received signals and a symbol estimate;

generating a branch metric from the generated impairment autocorrelation matrix and the first plurality of estimated signal medium response coefficients;

generating a new symbol estimate from the generated branch metric; and generating a second plurality of estimated signal medium response coefficients from the plurality of received signals and the generated new symbol estimate.

8. A method according to claim 7:

wherein said step of generating an impairment autocorrelation matrix comprises the steps of:

generating a plurality of impairment autocorrelation matrices over a time interval; and processing the generated plurality of impairment autocorrelation matrices with a tracking filter to produce a predicted impairment autocorrelation matrix; and wherein said step of generating a branch metric comprises the step of generating the branch metric from the predicted impairment autocorrelation matrix.

9. A method according to claim 8, wherein the desired radio signal is formatted according to a slotted communications protocol defined according to a plurality of time slots, and wherein said step of generating a plurality of impairment autocorrelation matrices over a time interval comprises the step of generating a plurality of impairment autocorrelation matrices over at least one time slot of said plurality of time slots.

10. A method according to claim 7, wherein said step of generating a symbol estimate comprises the step of generating a symbol estimate from the generated branch metric according to a maximum likelihood sequence estimation (MLSE) process.

11. A method according to claim 3, wherein said step of determining a direction of arrival for the ray comprises the steps of:

determining an autocorrelation value for the ray of the desired radio signal;

determining a plurality of power spectral density values for the ray at a like plurality of directions using the determined autocorrelation value; and identifying a direction of the plurality of directions having a maximum associated determined power spectral density value to thereby determine a direction of arrival for the ray.

12. A method according to claim 3:
wherein said step of determining a direction of arrival for the ray comprises the steps of:
determining a plurality of directions of arrival for the ray over a time interval; and
processing the determined plurality of directions of arrival with a tracking filter to produce a predicted direction of arrival for the ray; and
wherein said step of determining a direction for the desired radio signal from the determined direction of arrival for the ray comprises the step of determining a direction for the desired radio signal from the predicted direction of arrival for the ray.

13. A method according to claim 12, wherein the desired radio signal is formatted according to a slotted communications protocol defined according to a plurality of time slots, and wherein said step of determining a plurality of directions of arrival for the ray over a time interval comprises the step of determining a plurality of directions of arrival for the ray over at least one of said plurality of time slots.

14. A method according to claim 7, further comprising the step of determining a direction for an interfering radio signal of the plurality of radio signals from the generated impairment autocorrelation matrix.

15. A method according to claim 8, further comprising the step of determining a direction for an interfering radio signal of the plurality of radio signals from the predicted impairment autocorrelation matrix.

16. A method according to claim 9, further comprising the step of determining a direction for an interfering radio signal of the plurality of radio signals from the predicted impairment autocorrelation matrix.

17. A method according to claim 14, wherein said step of determining a direction for an interfering radio signal comprises the steps of:
determining a plurality of power spectral density values for the interfering radio signal at a like plurality of directions using the generated impairment autocorrelation matrix; and
identifying a direction of the plurality of directions having a maximum associated determined power spectral density value to thereby determine a direction for the interfering radio signal.

18. A method according to claim 17, wherein said step of determining a direction for the interfering radio signal comprises the steps of:
determining a plurality of directions of arrival for the interfering radio signal over a time interval; and
processing the determined plurality of directions of arrival with a tracking filter to produce a predicted direction of arrival for the interfering radio signal.

19. A method according to claim 18, wherein the desired radio signal is formatted according to a slotted communications protocol defined according to a plurality of time slots, and wherein said step of determining a plurality of directions of arrival for the interfering radio signal over a time interval comprises the step of determining a plurality of directions of arrival for the interfering radio signal over at least one of said time slots.

20. An apparatus for receiving a desired radio signal generated in a communications medium, the station comprising:

means, responsive to the communications medium, for receiving a plurality of radio signals from the communications medium;
means, responsive to said means for receiving, for generating a plurality of estimated signal medium response coefficients for a ray of the desired radio signal from the plurality of received radio signals; and
means, responsive to said means for generating, for determining a direction for the desired radio signal from the plurality of estimated signal medium response coefficients for the ray of the desired radio signal.

21. An apparatus according to claim 20, wherein said means for receiving comprises a plurality of antennas, a respective one of which produces a respective one of the plurality of received signals.

22. An apparatus according to claim 21:
wherein said means for determining a direction for the desired radio signal comprises means for determining a direction of arrival for the ray from the corresponding plurality of estimated signal medium response coefficients for the ray; and
wherein said means for determining a direction for the desired radio signal comprises means for determining a direction for the desired radio signal from the determined direction of arrival for the ray.

23. An apparatus according to claim 21:
wherein said means for generating a plurality of estimated signal medium response coefficients comprises:
means for generating a series of pluralities of estimated signal medium response coefficients over a time interval; and
means for processing the series of pluralities of estimated signal medium response coefficients with a tracking filter to produce a plurality of predicted signal medium response coefficients; and
wherein said means for determining a direction for the desired radio signal comprises means for determining a determining a direction for the desired radio signal from the plurality of predicted signal medium response coefficients for the ray of the desired radio signal.

24. An apparatus according to claim 23, wherein the desired radio signal is formatted according to a slotted communications protocol defined according to a plurality of time slots, wherein said means for generating a series of pluralities of estimated signal medium response coefficients over a time interval comprises means for generating a series of pluralities of estimated signal medium response coefficients over at least one of said plurality of time slots.

25. An apparatus according to claim 22, wherein the desired radio signal represents a sequence including a predetermined training sequence, and wherein said means for generating a plurality of estimated signal medium response coefficients comprises means for generating a plurality of estimated signal medium response coefficients from the plurality of received radio signals based on the predetermined training sequence.

26. An apparatus according to claim 23, wherein said means for generating a plurality of estimated signal medium response coefficients for the ray comprises:
means for generating a first plurality of estimated signal medium response coefficients;
means, responsive to said means for generating a first plurality of estimated signal medium response coefficients, generating an impairment autocorrelation matrix from the plurality of received signals and a symbol estimate;

means, responsive to said means for generating an impairment autocorrelation matrix, for generating a branch metric from the generated impairment autocorrelation matrix and the first plurality of estimated signal medium response coefficients;

means, responsive to said means for generating a branch metric, for generating a new symbol estimate from the generated branch metric; and means, responsive to said means for generating a symbol estimate, for generating a second plurality of estimated signal medium response coefficients from the plurality of received signals and the generated new symbol estimate.

27. An apparatus according to claim 26:

wherein said means for generating an impairment autocorrelation matrix comprises:

means for generating a plurality of impairment autocorrelation matrices over a time interval; and means, responsive to said means for generating a plurality of impairment autocorrelation matrices, for processing the generated plurality of impairment autocorrelation matrices with a tracking filter to produce a predicted impairment autocorrelation matrix; and wherein said means for generating a branch metric comprises means for generating the branch metric from the predicted impairment autocorrelation matrix.

28. An apparatus according to claim 27, wherein the desired radio signal is formatted according to a slotted communications protocol defined according to a plurality of time slots, and wherein said means for generating a plurality of impairment autocorrelation matrices over a time interval comprises means for generating a plurality of impairment autocorrelation matrices over at least one time slot of said plurality of time slots.

29. An apparatus according to claim 26, wherein said means for generating a symbol estimate comprises means for generating a symbol estimate from the generated branch metric according to a maximum likelihood sequence estimation (MLSE) process.

30. An apparatus according to claim 22, wherein said means for determining a direction of arrival for the ray comprises:

means for determining an autocorrelation value for the ray of the desired radio signal;

means, responsive to said means for determining an autocorrelation value for the ray, for determining a plurality of power spectral density values for the ray at a like plurality of directions using the determined autocorrelation value; and means, responsive to said means for determining a plurality of power spectral density values, for identifying a direction of the plurality of directions having a maximum associated determined power spectral density value to thereby determine a direction of arrival for the ray.

31. An apparatus according to claim 22:

wherein said means for determining a direction of arrival for the ray comprises:

means for determining a plurality of directions of arrival for the ray over a time interval; and means, responsive to said means for determining a plurality of directions of arrival, for processing the determined plurality of directions of arrival with a tracking filter to produce a predicted direction of arrival for the ray; and wherein said means for determining a direction for the desired radio signal from the determined direction of arrival for the ray comprises means for determining a direction for the desired radio signal from the predicted direction of arrival for the ray.

32. An apparatus according to claim 31, wherein the desired radio signal is formatted according to a slotted communications protocol defined according to a plurality of time slots, and wherein said means for determining a plurality of directions of arrival for the ray over a time interval comprises means for determining a plurality of directions of arrival for the ray over at least one of said plurality of time slots.

33. An apparatus according to claim 27, further comprising means for determining a direction for an interfering radio signal of the plurality of radio signals from the generated impairment autocorrelation matrix.

34. An apparatus according to claim 27, further comprising means for determining a direction for an interfering radio signal of the plurality of radio signals from the predicted impairment autocorrelation matrix.

35. An apparatus according to claim 28, further comprising means for determining a direction for an interfering radio signal of the plurality of radio signals from the predicted impairment autocorrelation matrix.

36. An apparatus according to claim 33, wherein said means for determining a direction for an interfering radio signal comprises:

means for determining a plurality of power spectral density values for the interfering radio signal at a like plurality of directions using the generated impairment autocorrelation matrix; and means, responsive to said means for determining a plurality of power spectral density values, for identifying a direction of the plurality of directions having a maximum associated determined power spectral density value to thereby determine a direction for the interfering radio signal.

37. An apparatus according to claim 36, wherein said means for determining a direction for the interfering radio signal comprises:

means for determining a plurality of directions of arrival for the interfering radio signal over a time interval; and means, responsive to said means for determining a plurality of directions of arrival, for processing the determined plurality of directions of arrival with a tracking filter to produce a predicted direction of arrival for the interfering radio signal.

38. An apparatus according to claim 37, wherein the desired radio signal is formatted according to a slotted communications protocol defined according to a plurality of time slots, and wherein said means for determining a plurality of directions of arrival for the interfering radio signal over a time interval comprises means for determining a plurality of directions of arrival for the interfering radio signal over at least one of said time slots.

39. An apparatus for determining a direction of a desired radio signal, the apparatus comprising:

a receiver that receives a plurality of radio signals from a communications medium; and a signal direction determining circuit, responsive to said receiver, that generates a plurality of estimated signal medium response coefficients for a ray of the desired radio signal from the plurality of received radio signals, and that determines a direction for the desired radio signal from the plurality of estimated signal medium response coefficients for the ray of the desired radio signal.

40. An apparatus according to claim 39, wherein said signal direction determining circuit generates a first plurality of estimated signal medium response coefficients, generates an impairment autocorrelation matrix from the plurality of received signals and a symbol estimate, generates a branch metric from the generated impairment autocorrelation matrix and the first plurality of estimated signal medium response coefficients, generates a new symbol estimate from the generated branch metric, and generates a second plurality of estimated signal medium response coefficients from the plurality of received signals and the generated new symbol estimate.

41. An apparatus according to claim 40, wherein said signal direction determining circuit generates a plurality of impairment autocorrelation matrices over a time interval, produces a predicted impairment autocorrelation matrix form the plurality of impairment autocorrelation matrices, and generates the branch metric from the predicted impairment autocorrelation matrix.

42. An apparatus according to claim 39, wherein said signal direction determining circuit determines an autocorrelation value for the ray of the desired radio signal, determines a plurality of power spectral density values for the ray at a like plurality of directions using the determined autocorrelation value, and identifies a direction of the plurality of directions having a maximum associated determined power spectral density value to thereby determine a direction of arrival for the ray.

43. An apparatus according to claim 40, wherein said signal direction determining circuit is further operative to determine a direction for an interfering radio signal of the plurality of radio signals from the generated impairment autocorrelation matrix.

* * * * *